United States Patent
Ueda et al.

(10) Patent No.: US 11,794,213 B2
(45) Date of Patent: Oct. 24, 2023

(54) SORTING FACILITY

(71) Applicant: DAIFUKU CO., LTD., Osaka (JP)

(72) Inventors: Yuichi Ueda, Shiga (JP); Osamu Matsui, Shiga (JP); Hiroyuki Koide, Shiga (JP); Atsushi Ishikura, Shiga (JP)

(73) Assignee: DAIFUKU CO., LTD., Osaka (JP)

(*) Notice: Subject to any disclaimer, the term of this patent is extended or adjusted under 35 U.S.C. 154(b) by 0 days.

(21) Appl. No.: 17/143,730

(22) Filed: Jan. 7, 2021

(65) Prior Publication Data
US 2021/0205853 A1 Jul. 8, 2021

(30) Foreign Application Priority Data
Jan. 8, 2020 (JP) ................................ 2020-001108

(51) Int. Cl.
*B07C 3/08* (2006.01)
*B65G 47/68* (2006.01)

(52) U.S. Cl.
CPC .............. *B07C 3/082* (2013.01); *B65G 47/68* (2013.01)

(58) Field of Classification Search
CPC .. B07C 3/082; B07C 3/08; B07C 3/06; B65G 47/68; B65G 47/30; B65G 47/64;
(Continued)

(56) References Cited

U.S. PATENT DOCUMENTS 4,096,936 A * 6/1978 Nielsen ................ B65G 17/345
198/370.06
5,588,520 A * 12/1996 Affaticati ................ B61B 13/08
198/370.06
(Continued)

FOREIGN PATENT DOCUMENTS

| CN | 105618384 A | * | 6/2016 |
| CN | 105905550 A | * | 8/2016 |
| CN | 108554829 A | * | 9/2018 |
| CN | 108636815 A | * | 10/2018 |
| CN | 108946002 A | * | 12/2018 |

(Continued)

OTHER PUBLICATIONS

European Search Report dated Jun. 8, 2021 in corresponding European Patent Appl. No. 20217787.9
(Continued)

*Primary Examiner* — Gene O Crawford
*Assistant Examiner* — Muhammad Awais
(74) *Attorney, Agent, or Firm* — KUSNER & JAFFE

(57) ABSTRACT

A sorting facility for sorting an article by a belt conveyor provided on a traveling carriage traveling along a conveyance path. A plurality of traveling carriages travel on the conveyance path. Each of the plurality of traveling carriages is provided with a power generation motor generating electric power by traveling of the traveling carriage. The belt conveyor provided on each of the plurality of traveling carriages is driven in a predetermined position on the conveyance path by the electric power generated by the power generation motor. The power generation motor provided in each of the plurality of traveling carriages starts generation of the electric power necessary to drive the belt conveyor in order from the power generation motor provided in the traveling carriage scheduled to pass the predetermined position on the conveyance path first, after the traveling carriages are actuated and traveling speeds become a constant speed.

9 Claims, 3 Drawing Sheets

(58) Field of Classification Search
CPC ............ B65G 47/96; B65G 2203/0283; B65G 2203/0291; B65G 43/00; B65G 35/00
USPC .................................................. 209/707, 552
See application file for complete search history.

(56) References Cited

U.S. PATENT DOCUMENTS

| | | | | |
|---|---|---|---|---|
| 5,690,209 | A * | 11/1997 | Kofoed | B65G 17/345 198/370.06 |
| 6,938,750 | B2 * | 9/2005 | Miller | B65G 17/345 198/370.04 |
| 9,688,477 | B2 * | 6/2017 | Chierego | B07C 3/08 |
| 9,828,187 | B2 * | 11/2017 | Chierego | B65G 47/53 |
| 10,526,146 | B1 | 1/2020 | Resnick | |
| 2002/0017537 | A1 * | 2/2002 | Barklin | B65G 47/96 222/240 |
| 2002/0079254 | A1 * | 6/2002 | Soldavini | B65G 47/96 209/919 |
| 2013/0167751 | A1 * | 7/2013 | Rosenwinkel | B61B 13/04 104/118 |
| 2014/0014468 | A1 * | 1/2014 | Pilarz | B65G 17/345 198/370.03 |
| 2015/0239015 | A1 * | 8/2015 | Asari | B65G 47/68 209/606 |
| 2016/0052722 | A1 * | 2/2016 | Fujihara | B65G 17/345 198/358 |
| 2017/0029215 | A1 * | 2/2017 | Parodi | B65G 54/02 |
| 2017/0057751 | A1 | 3/2017 | Fujihara | |
| 2018/0264521 | A1 * | 9/2018 | Chapelet | B07C 1/16 |
| 2019/0184430 | A1 * | 6/2019 | Fumagalli | B07C 5/362 |

FOREIGN PATENT DOCUMENTS

| | | | | |
|---|---|---|---|---|
| CN | 110077793 | A | * | 8/2019 |
| CN | 110077794 | A | * | 8/2019 |
| CN | 110340023 | A | * | 10/2019 |
| CN | 110525869 | A | * | 12/2019 ............ B65G 17/345 |
| DE | 10127127 | A1 | * | 1/2003 ............ B65G 17/345 |
| EP | 1216938 | A1 | | 6/2002 |
| EP | 1216938 | A1 | * | 6/2002 ............ B65G 17/345 |
| JP | S63-37619 | U | | 3/1988 |
| JP | H8-333021 | A | | 12/1996 |
| JP | 2002-226038 | A | | 8/2002 |
| JP | 2018-122985 | A | | 8/2018 |
| WO | WO2011/107815 | A1 | | 9/2011 |
| WO | WO-2011107815 | A1 | * | 9/2011 ............... B60K 7/00 |

OTHER PUBLICATIONS

Notice of Reasons for Refusal issued in related Japanese Patent Application No. 2020-001108 dated Dec. 20, 2022.

* cited by examiner

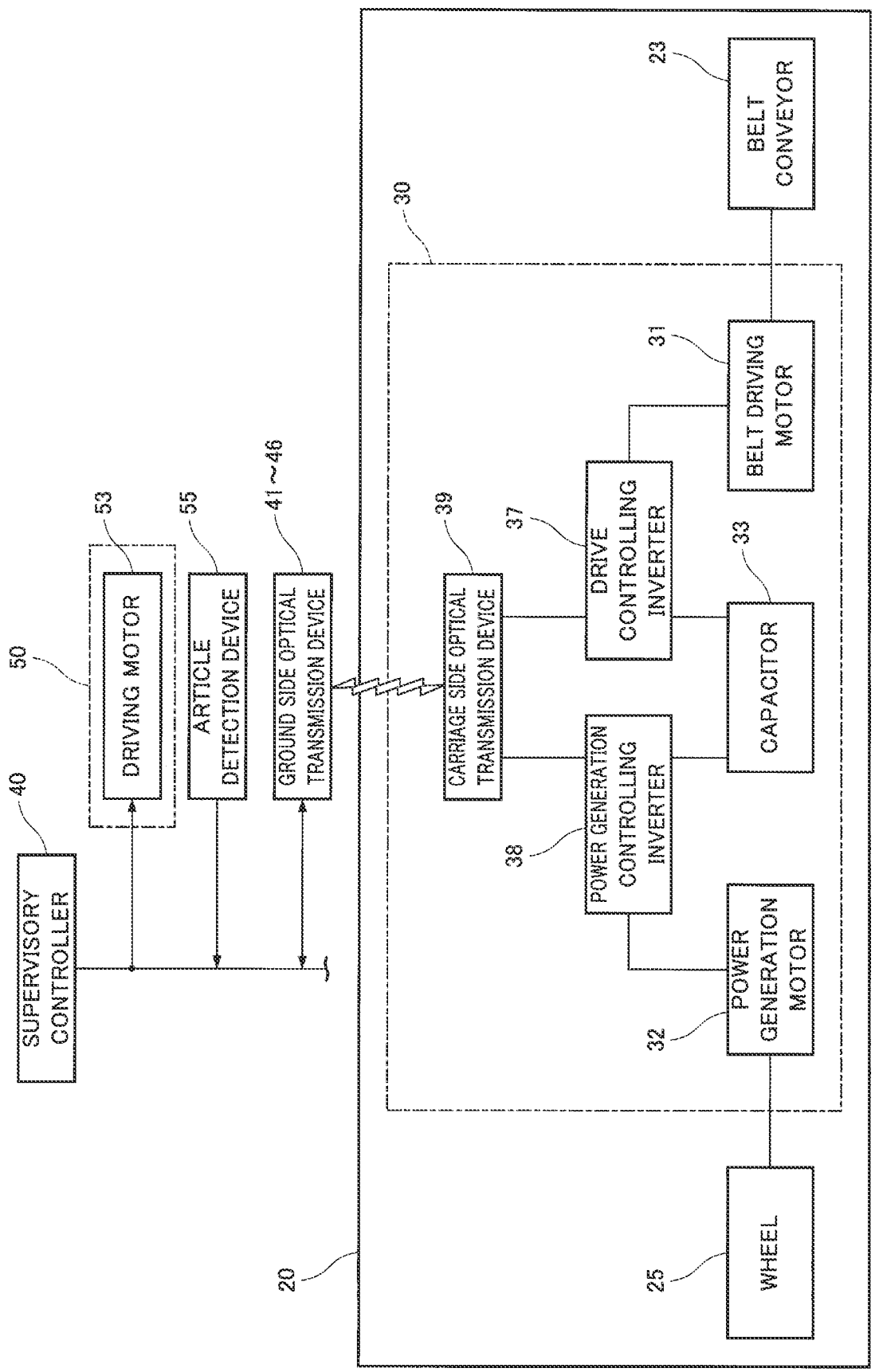

SORTING FACILITY

FIELD OF THE INVENTION

The present invention relates to sorting facility that sorts articles by belt conveyors provided in traveling carriages traveling along a conveyance path.

BACKGROUND OF THE INVENTION

Conventionally, there has been sorting facility as shown in Japanese Patent Laid-Open No. 2018-122985, as the sorting facility sorting articles by the belt conveyors provided in the traveling carriages traveling along the conveyance path.

The sorting facility in Japanese Patent Laid-Open No. 2018-122985 sorts articles by running a plurality of traveling carriages connected endlessly along a loop-shaped conveyance path. The traveling carriages each include a belt conveyor where an article can be placed. The traveling carriages each receive an article transferred from a loading conveyor provided beside the conveyance path into the belt conveyor. When the traveling carriages convey the received articles to a predetermined position, the traveling carriages each deliver the received article to a delivery conveyor provided beside the conveyance path by driving the belt conveyor.

The traveling carriages are driven by friction drive type driving devices provided at predetermined positions of the conveyance path, and between a pair of rails. The traveling carriage has traveling wheels rotating while sliding in contact with the rails during traveling.

The belt conveyor is driven by a driving motor provided in the traveling carriage. The driving motor drives the belt conveyor based on electric power supplied from a power generation device provided in the traveling carriage. The power generation device generates electric power by a rotary shaft fixed to the traveling wheels rotating by travelling of the traveling carriage.

In this way, in the sorting facility, in order to run the traveling carriages, the driving devices for running the traveling carriages provided in the predetermined positions of the conveyance path are driven, while in order to drive the belt conveyors, the traveling carriages are run to cause the power generation devices to generate electric power, and the driving motors are driven by the generated electric power. In other words, in order to drive the belt conveyors, it is necessary to drive the driving devices for running the traveling carriages to run the traveling carriages.

In the conventional sorting facility as shown in Japanese Patent Laid-Open No. 2018-122985, when all the traveling carriages in the equipment stop traveling, after all sorting operations in the equipment are finished, or due to a power failure in the equipment or the like, it is necessary to simultaneously actuate all the traveling carriages stopping in the equipment when the sorting operations are restarted in the equipment or after the power failure in the equipment is restored. However, when all the traveling carriages in the equipment are run by the driving force of the driving devices for running the traveling carriages, and the power generation devices provided in all the traveling carriages in the equipment are simultaneously caused to generate power, the driving force of the driving devices is distributed to traveling of the traveling carriages, and power generation of the power generation devices. Accordingly, the driving devices need to output a force equal to or more than the driving force necessary to run all the traveling carriages in the equipment at a time of actuation. Therefore, an excessive load is exerted on the driving devices at the time of actuation, and it is impossible to distribute the driving force necessary to run the traveling carriages sufficiently to the traveling carriages. Consequently, there has unfortunately been the problem of being unable to run the traveling carriages stably at the time of actuation of the traveling carriages.

SUMMARY OF THE INVENTION

It is an object of the present invention to provide a sorting facility that can reduce a load on driving device for running traveling carriages at a time of actuation of traveling carriages having belt conveyors sorting articles.

The problem to be solved by the present invention is described above, and a solution to the problem will be described next.

In other words, sorting facility of the present invention is sorting facility sorting an article by a belt conveyor provided on a traveling carriage traveling along a conveyance path, wherein a plurality of the traveling carriages travel on the conveyance path, each of the plurality of the traveling carriages is provided with a power generation device generating electric power by traveling of the traveling carriage, the belt conveyor provided on each of the plurality of the traveling carriages is driven in a driving position provided in a predetermined position on the conveyance path by the electric power generated by the power generation device, and the power generation device provided in each of the plurality of the traveling carriages starts generation of electric power necessary to drive the belt conveyor in order from the power generation device provided in the traveling carriage scheduled to pass the driving position first after the plurality of the traveling carriages are actuated and traveling speeds of the plurality of the traveling carriages are kept constant at a predetermined speed.

In the configuration, generation of the electric power necessary to drive the belt conveyor is started in order from the power generation device provided in the traveling carriage scheduled to pass the driving position first, after the plurality of traveling carriages are actuated and the traveling speeds of the plurality of traveling carriages are kept constant at the predetermined speed. That is to say, power generation of the power generation device by traveling of the traveling carriage (driving force of the driving device for running the traveling carriage) is started in order from the power generation device provided in the traveling carriage scheduled to pass the position for driving the belt conveyor on the traveling carriage first, after the plurality of traveling carriages are actuated and the traveling speeds are kept constant at the predetermined speed.

The sorting facility of the present invention is the above described sorting facility, wherein the power generation device starts generation of the electric power necessary to drive the belt conveyor by the traveling carriage provided with the power generation device traveling to a position at an upstream side from the driving position after the plurality of the traveling carriages are actuated and the traveling speeds are kept constant at the predetermined speed.

In the configuration, generation of the electric power necessary to drive the belt conveyor is started by the traveling carriage provided with the power generation device traveling to the upstream side from the driving position, after the plurality of traveling carriages are actuated and the traveling speeds are kept constant at the predetermined speed. In other words, power generation of the power generation device by traveling of the traveling carriage (driving force of the driving device for running the traveling carriage) is started by the traveling carriage provided with the power generation device traveling to the upstream side from the position for driving the belt conveyor on the traveling carriage after the plurality of traveling carriages are actuated and the traveling speeds are kept constant at the predetermined speed.

The sorting facility of the present invention is the above described sorting facility, wherein a ground side communication device communicable with the power generation device is provided in a position at an upstream side from the driving position, and the power generation device starts generation of the electric power necessary to drive the belt conveyor by the traveling carriage provided with the power generation device traveling to the position at the upstream side from the driving position and receiving a signal from the ground side communication device after the plurality of traveling carriages are actuated and the traveling speeds are kept constant at the predetermined speed.

In the configuration, generation of the electric power necessary to drive the belt conveyor is started by the signal from the ground side communication device provided at the upstream side from the driving position. In other words, power generation of the power generation device by traveling of the traveling carriage (driving force of the driving device for running the traveling carriage) is started after the plurality of traveling carriages are actuated, and the traveling speeds are kept constant at the predetermined speed, and is started by the signal from the ground side communication device provided at the upstream side from the driving position.

The sorting facility of the present invention is the above described sorting facility, wherein the driving position is any of a loading position for loading an article onto the belt conveyor, an adjustment position being a position at a downstream side from the loading position and for adjusting a placement location of the article on the belt conveyor, and a delivery position being a position at a downstream side from the adjustment position and for delivering the article on the belt conveyor.

In the configuration, generation of the electric power necessary to drive the belt conveyor is started by the traveling carriage traveling to any position of the position at the upstream side from the loading position of the article to the belt conveyor, the position at the upstream side from the delivery position of the article from the belt conveyor, and the position at the upstream side from the adjustment position for adjusting the placement location of the article on the belt conveyor, after the plurality of traveling carriages are actuated and the traveling speeds are kept constant at the predetermined speed. In other words, power generation of the power generation device by traveling of the traveling carriage (driving force of the driving device for running the traveling carriage) is started by traveling to the position at the upstream side from the position necessary to drive the belt conveyor on the traveling carriage after the plurality of traveling carriages are actuated and the traveling speeds are kept constant at the predetermined speed.

According to the sorting facility of the present invention, generation of the electric power necessary to drive the belt conveyor is started in order from the power generation device provided in the traveling carriage scheduled to pass the position (driving position) for driving the belt conveyor on the traveling carriage first, after the plurality of traveling carriages are actuated and the traveling speeds are kept constant at the predetermined speed, and therefore it is possible to distribute timings of power generation of the power generation devices at the time of actuation of the traveling carriages. Accordingly, at the time of actuation of the traveling carriages, the power generation devices provided in all the traveling carriages traveling on the conveyance path do not simultaneously start power generation to drive the belt conveyors, and it is possible to reduce the load on the driving device for running the traveling carriages. Accordingly, it is possible to sufficiently distribute the driving force of the driving device to traveling of the traveling carriages, and it is possible to stably run the traveling carriages at the time of actuation of the traveling carriages. It is also possible to shorten the time period until the traveling carriages stably travel at the predetermined conveyance speed after the traveling carriages are actuated.

BRIEF DESCRIPTION OF THE DRAWINGS

FIG. 3 is a block diagram illustrating a control configuration of a traveling carriage traveling in the sorting facility according to the present invention.

DETAILED DESCRIPTION OF THE INVENTION

Sorting facility 10 of the present invention will be described. The present invention is not limited to the sorting facility 10 shown as follows.

Figure 1:
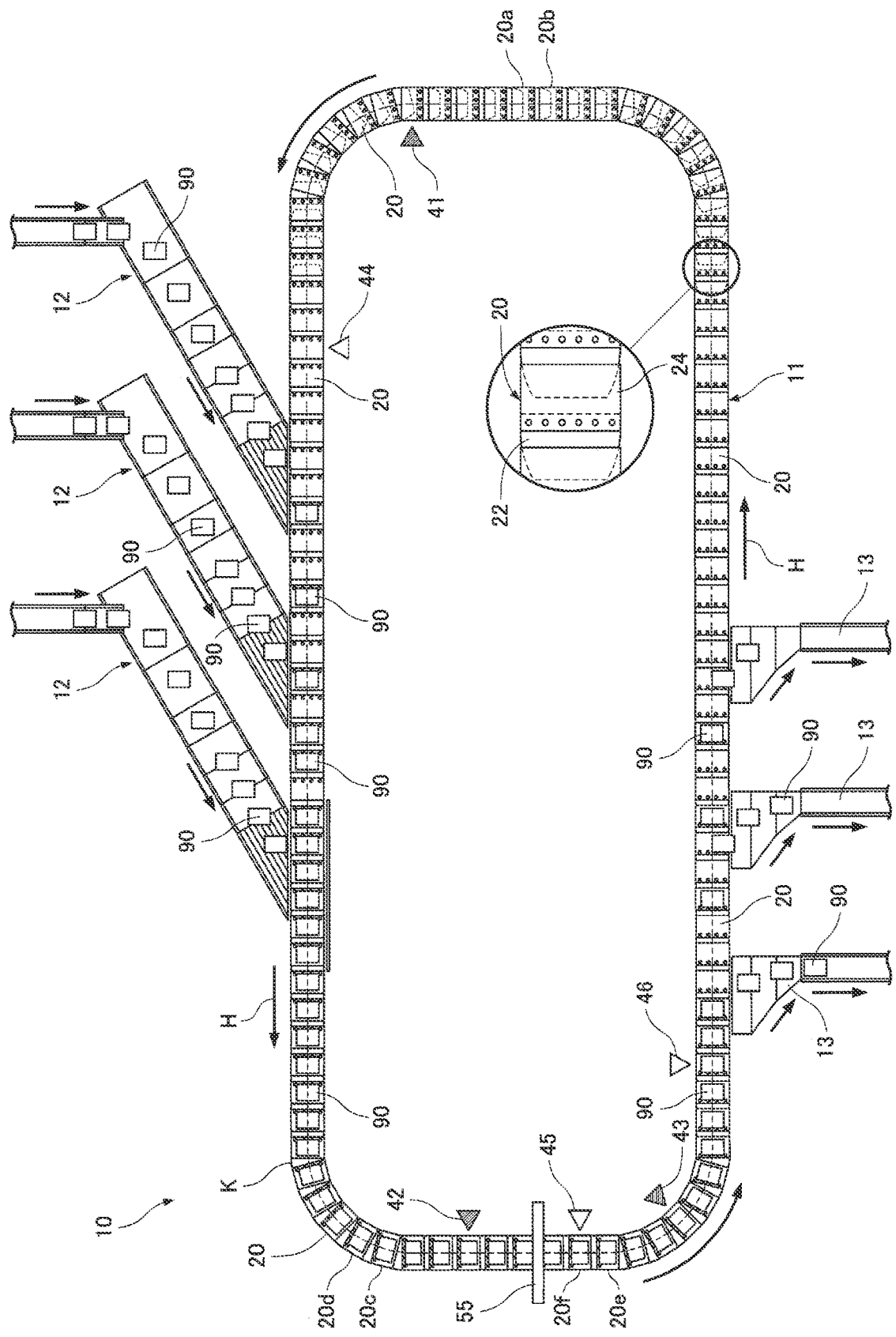
FIG. 1 is a schematic plan view of sorting facility according to the present invention.

As illustrated in FIG. 1, in the sorting facility 10, a loop-shaped conveyance path K for conveying articles 90 is formed. The conveyance path for conveying the articles 90 is not limited to the loop-shaped conveyance path K. The sorting facility 10 is mainly composed of a main conveyor device 11 conveying the articles 90 along the conveyance path K, a plurality of induction conveyors 12 inputting the articles 90 onto the conveyance path K of the main conveyor device 11, a plurality of chutes 13 receiving the articles 90 delivered from the conveyance path K of the main conveyor device 11, and an article detection device 55 detecting a placement location of the article 90 on a belt conveyor 23.

In the sorting facility 10, the article 90 is inputted to the traveling carriage 20 traveling along rails (see FIG. 2) of the main conveyor device 11 from a predetermined induction conveyor 12. The article 90 inputted to the traveling carriage 20 is conveyed along the conveyance path K. The article 90 conveyed by the traveling carriage 20 is delivered to the chute 13 assigned to each store, and is sorted by store, for example. The article 90 conveyed by the traveling carriage 20 is adjusted so that a placement location on the belt conveyor 23 is in a center position of the belt conveyor 23 based on detection by the article detection device 55, before delivered to the chute 13.

The devices (the main conveyor device 11, the induction conveyors 12, the chute 13, the article detection device 55) of the sorting facility 10 are connected to a supervisory controller 40 (see FIG. 3) controlling the entire sorting facility 10, and are controlled by the supervisory controller 40.

In the main conveyor device 11, the traveling carriage 20 with the article 90 placed thereon travels on the rails 14 (see FIG. 2), and thereby the article 90 is conveyed along the conveyance path K.

The induction conveyor 12 inputs the article 90 to the belt conveyor 23 of the traveling carriage 20 traveling on the conveyance path K. The plurality of (three in FIG. 1) induction conveyors 12 are disposed side by side along the conveyance path K. In the induction conveyors 12, the traveling carriage 20 where the article 90 should be inputted in advance is searched for and determined for each of the induction conveyors 12. The induction conveyor 12 inputs the article 90 to the predetermined traveling carriage 20 determined for each of the induction conveyors 12.

The chute 13 receives the article 90 delivered from the traveling carriage 20, and conveys the received article 90 to different downstream equipment (for example, shipment equipment), directly to a vehicle (for example, a truck), or the like. The plurality of (three in FIG. 1) chutes 13 are disposed side by side along the conveyance path K. The chute 13 receives the article 90 determined in advance for each of the chutes 13 from the traveling carriage 20.

The article detection device 55 is composed of a plurality of sensors provided above the main conveyor device 11, at a conveyance downstream side of the induction conveyor 12, and at a conveyance upstream side of the chute 13. The article detection device 55 detects the placement location of the article 90 placed on the belt conveyor 23, and transmits a detection result to the supervisory controller 40 (see FIG. 3). The supervisory controller 40 calculates a deviation of the article 90 placed on the belt conveyor 23 from the center position of the belt conveyor 23, based on the detection result from the article detection device 55. The supervisory controller 40 controls the belt conveyor 23 so that the belt conveyor 23 moves the article 90 to the center position of the belt conveyor 23 based on the calculated deviation amount.

Next, the traveling carriage 20 traveling on the conveyance path K will be described.

Figure 2:
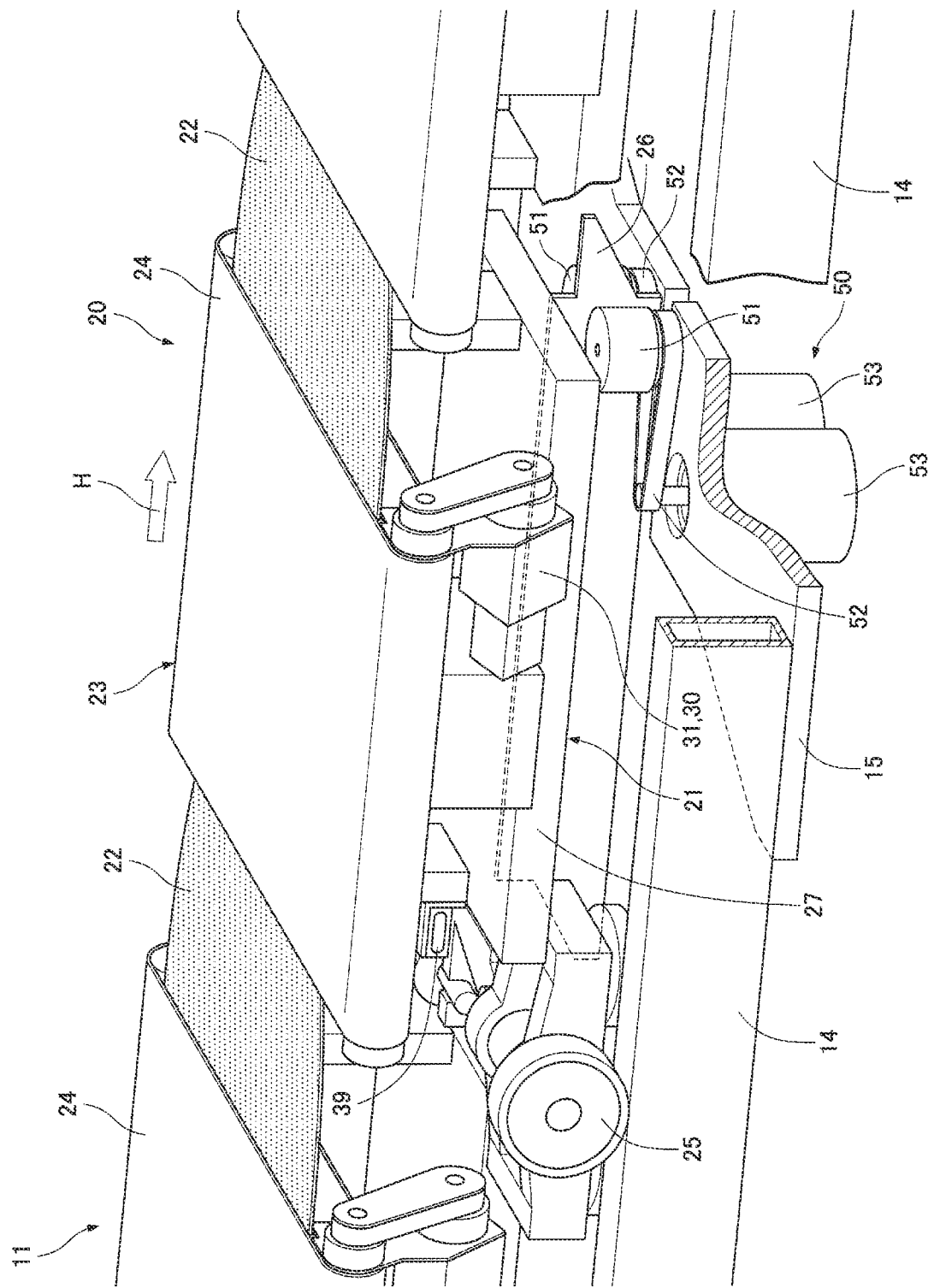
FIG. 2 is a perspective view of a traveling carriage traveling in the sorting facility according to the present invention.

As illustrated in FIGS. 1 and 2, the traveling carriage 20 receives the article 90 inputted from the predetermined induction conveyor 12. The traveling carriage 20 conveys the received article 90 along the conveyance path K and delivers the article 90 to the predetermined chute 13. The traveling carriage 20 is connected to the traveling carriages 20 adjacent to one another in the conveyance path K, and travels on the rails 14 in a state connected to the adjacent traveling carriages 20. In other words, the plurality of traveling carriages 20 connected to one another travel on the conveyance path K.

The traveling carriage 20 travels by drive of a carriage driving device 50. The carriage driving device 50 is a friction drive type driving device. The carriage driving device 50 includes pinch rollers 51 contacting both side surfaces of a fin 26 of the traveling carriage 20, timing belts 52 rotating the pinch rollers 51, and driving motors 53 driving the pinch rollers 51. The carriage driving device 50 is a driving device transmitting motive power to the traveling carriage 20 by using a frictional force by contact of the pair of pinch rollers 51. The carriage driving device 50 causes the rotating pair of pinch rollers 51 to contact both the side surfaces of the fin 26 of the traveling carriage 20. The carriage driving device 50 runs the traveling carriage 20 by thrusting the fin 26 forward by a frictional force by contact of the pair of pinch rollers 51. A plurality of carriage driving devices 50 are provided in predetermined positions of the conveyance path K, and are provided between a pair of rails 14. The carriage driving device 50 is supported by a support frame 15 fixed to the rails 14. As illustrated in FIG. 3, the carriage driving device 50 is connected to the supervisory controller 40, and is controlled by the supervisory controller 40.

As illustrated in FIGS. 1 and 2, the traveling carriage 20 mainly includes a body 21 traveling on the rails 14, a cover 22 covering a gap from the adjacent traveling carriage 20, the belt conveyor 23 where the article 90 is placed and supported, and a belt driving device 30 for driving the belt conveyor 23.

As illustrated in FIG. 2, the body 21 mainly includes a wheel 25 for traveling on the rails 14, the fin 26 contacting the pinch rollers 51 of the carriage driving device 50, and a frame 27 supporting components of the traveling carriage 20.

The fin 26 is a long plate member extended along a longitudinal direction (a traveling direction H of the traveling carriage 20) of the traveling carriage 20. The fin 26 is attached to a lower part of the body 21.

The cover 22 is composed of a plate-shaped member closing the gap between the traveling carriages 20 adjacent to each other in the conveyance path K. The cover 22 is fixed to a rear side end portion of the traveling carriage 20 (end portion at a rear side to the traveling direction H of the traveling carriage 20).

The belt conveyor 23 is provided at an upper part of the body 21. The belt conveyor 23 conveys the article 90 placed on a belt 24 in a direction horizontally orthogonal to the traveling direction H of the traveling carriage 20, by the belt 24 being driven by the belt driving device 30. When the traveling carriage 20 reaches a predetermined induction conveyor 12, the belt 24 is driven by the belt driving device 30, and thereby the belt conveyor 23 moves the article 90 inputted from the induction conveyor 12 to an appropriate placement location on the belt 24. When the traveling carriage 20 reaches a predetermined chute 13, the belt 24 is driven by the belt driving device 30, and thereby the belt conveyor 23 discharges the article 90 placed on the belt 24 in a direction where the chute 13 is located. When the article 90 on the belt 24 deviates from the appropriate position on the belt 24 during conveyance of the article 90 by the traveling carriage 20, the belt 24 is driven by the belt driving device 30, and thereby the belt conveyor 23 adjusts the placement location of the article 90 to the appropriate position.

As illustrated in FIGS. 2 and 3, the belt driving device 30 is mainly composed of a belt driving motor 31 for driving the belt 24 of the belt conveyor 23, a power generation motor 32 (an example of a "power generation device") for generating electric power for driving the belt 24 of the belt conveyor 23, a capacitor 33 storing electric power generated by the power generation motor 32, a drive controlling inverter 37 for controlling the belt driving motor 31, a power generation controlling inverter 38 for controlling the power generation motor 32, and a carriage side optical transmission device 39 receiving signals from ground side optical transmission devices 41, 42, 43, 44, 45, and 46 provided on a ground side.

The belt driving motor 31 is composed of, for example, a sensor-less servomotor. The belt driving motor 31 is connected to the belt conveyor 23, and drives the belt 24 of the belt conveyor 23. The belt driving motor 31 is connected to the drive controlling inverter 37, and has the number of revolutions controlled by the drive controlling inverter 37.

The power generation motor 32 is composed of, for example, a sensor-less servo motor. The power generation motor 32 is connected to the wheel 25 of the traveling carriage 20, and generates electric power by a rotary shaft of the power generation motor 32 rotating by rotation of the wheel 25. The power generation motor 32 is connected to the power generation controlling inverter 38, and has required torque controlled by the power generation controlling inverter 38.

The capacitor 33 is connected to the belt driving motor 31 and the power generation motor 32 via the drive controlling inverter 37 and the power generation controlling inverter 38, and stores the electric power generated by the power generation motor 32, and supplies the stored electric power to the belt driving motor 31.

The drive controlling inverter 37 is connected to the belt driving motor 31, and controls the number of revolutions of the belt driving motor 31. The drive controlling inverter 37 is connected to the capacitor 33, and controls the electric power supplied to the belt driving motor 31 from the capacitor 33.

The power generation controlling inverter 38 is connected to the power generation motor 32, and controls required torque of the power generation motor 32. The power generation controlling inverter 38 is connected to the capacitor 33, and controls electric power generated by the power generation motor 32 and stored in the capacitor 33.

The carriage side optical transmission device 39 is fixed to the frame 27 of the body 21. The carriage side optical transmission device 39 receives the signals from the ground side optical transmission devices 41, 42, 43, 44, 45, and 46 provided on the ground side by optical transmission. The carriage side optical transmission device 39 is connected to the drive controlling inverter 37 and the power generation controlling inverter 38, and transmits the signals from the ground side optical transmission devices 41, 42, 43, 44, 45, and 46 to the drive controlling inverter 37 and the power generation controlling inverter 38.

As illustrated in FIGS. 1 and 3, traveling of the traveling carriage 20 and an operation of the belt conveyor (belt driving device 30) are controlled by the supervisory controller 40 provided on the ground side (independently from the traveling carriage 20) and controlling the entire sorting facility 10. The traveling carriage 20 is not limited to being directly controlled by the supervisory controller 40 controlling the entire sorting facility 10, and may be controlled by a lower-order controller than the supervisory controller 40.

The supervisory controller 40 is connected to the ground side optical transmission devices 41, 42, 43, 44, 45, and 46 transmitting signals to the carriage side optical transmission device 39, and makes instructions to the traveling carriages 20 via the ground side optical transmission devices 41, 42, 43, 44, 45, and 46. In other words, the supervisory controller 40 controls the traveling carriages 20 by optical transmission (wireless).

The ground side optical transmission devices, 41, 42, 43, 44, 45, and 46 are devices performing optical transmission with the carriage side optical transmission devices 39 provided in the respective traveling carriages 20.

The ground side optical transmission devices 41, 42, and 43 transmit instruction signals for operating the power generation motor 32 to the power generation controlling inverter 38 to the carriage side optical transmission device 39. The power generation controlling inverter 38 operates the power generation motor 32 to cause the power generation motor 32 to start generation of power necessary to drive the belt conveyor 23, by receiving the instruction signals from the ground side optical transmission devices 41, 42 and 43.

The ground side optical transmission devices 44, 45, and 46 transmit instruction signals for operating the belt driving motor 31 to the drive controlling inverter 37 to the carriage side optical transmission device 39. The drive controlling inverter 37 operates the belt driving motor 31 in a drive position provided in the predetermined position in the conveyance path K as a position requiring drive of the belt conveyor 23, and starts driving of the belt 24 of the belt conveyor 23, by receiving the instruction signals from the ground side optical transmission devices 44, 45 and 46. Here, the driving position as the position requiring drive of the belt conveyor 23 refers to a position for loading the article 90 onto the belt conveyor 23 from the induction conveyor 12 ("loading position", the position contacting the downstream side of the induction conveyor 12 in the main conveyor device 11), the position for adjusting the placement location of the article 90 on the belt conveyor after the traveling carriage 20 passes through the article detection device 55 ("adjustment position"), and the position for delivering the article 90 on the belt conveyor to the chute 13 ("delivery position", the position contacting the upstream side of the chute 13 in the main conveyor device 11).

The fourth ground side optical transmission device transmits an instruction signal for driving the belt conveyor 23 when receiving the article 90 inputted from the induction conveyor 12 on the belt conveyor 23 of the traveling carriage 20. The drive controlling inverter 37 operates the belt driving motor 31 in the loading position by receiving the instruction signal from the ground side optical transmission device 44.

The fifth ground side optical transmission device 45 transmits an instruction signal for driving the belt conveyor 23 when adjusting the placement location of the article 90 on the belt conveyor 23 based on the detection result from the article detection device 55. The drive controlling inverter 37 operates the belt driving motor 31 in the adjustment position by receiving the instruction signal from the ground side optical transmission device 45.

The sixth ground side optical transmission device 46 transmits an instruction signal for driving the belt conveyor 23 when delivering the article 90 on the belt conveyor 23 to the chute 13. The drive controlling inverter operates the belt driving motor 31 in the delivery position by receiving the instruction signal from the ground side optical transmission device 46.

The ground side optical transmission devices 41, 42, 43, 44, 45, and 46 are provided along the conveyance path K.

Specifically, the first ground side optical transmission device 41 is provided at a conveyance upstream side from a position where the induction conveyor 12 at a most upstream side of the conveyance path K is disposed out of the three induction conveyors 12. In other words, the first ground side optical transmission device 41 is provided at a conveyance upstream side from the loading position (driving position).

The second ground side optical transmission device is provided at a conveyance downstream side from a position where the induction conveyor 12 at a most downstream side of the conveyance path K out of the three induction conveyors 12 is disposed, and at a conveyance upstream side from the position where the article detection device 55 is disposed. In other words, the second ground side optical transmission device 42 is provided at a position at a conveyance upstream side from the adjustment position (driving position).

The third ground side optical transmission device 43 is provided at a conveyance downstream side from the position where the article detection device 55 is disposed, and at a conveyance upstream side from a position where the chute 13 at a most upstream side of the conveyance path K out of the three chutes 13 is disposed. In other words, the third ground side optical transmission device 43 is provided at a position at a conveyance upstream side from the delivery position (driving position).

The fourth ground side optical transmission device is provided at a conveyance upstream side from the position where the induction conveyor 12 at the most upstream side of the conveyance path K out of the three induction conveyors 12 is disposed, and at a conveyance downstream side from a position where the first ground side optical transmission device 41 is disposed.

The fifth ground side optical transmission device 45 is provided at a conveyance downstream side from the position where the article detection device 55 is disposed, and at a conveyance upstream side from a position where the third ground side optical transmission device 43 is disposed.

The sixth ground side optical transmission device is provided at a conveyance downstream side from a position where the third ground side optical transmission device 43 is disposed, and at a conveyance upstream side from the position where the chute 13 at the most upstream side of the conveyance path K out of the three chutes 13 is disposed.

The first ground side optical transmission device 41 is provided at a conveyance upstream side from a position where the fourth ground side optical transmission device 44 is disposed. The second ground side optical transmission device 42 is provided at a conveyance upstream side from a position where the fifth ground side optical transmission device 45 is disposed. The third ground side optical transmission device 43 is provided at a conveyance upstream side from a position where the sixth ground side optical transmission device 46 is disposed.

An interval between the first ground side optical transmission device 41 and the fourth ground side optical transmission device 44, an interval between the second ground side optical transmission device 42 and the fifth ground side optical transmission device 45, and an interval between the third ground side optical transmission device 43 and the sixth ground side optical transmission device 46 are set at such distances that the power generation motor 32 can complete generation of electric power necessary to drive the belt conveyor 23 by the time when the traveling carriage 20 reaches the ground side optical transmission devices 44, 45, and 46 after passing the ground side optical transmission devices 41, 42, and 43. Accordingly, the interval between the first ground side optical transmission device 41 and the fourth ground side optical transmission device 44, the interval between the second ground side optical transmission device 42 and the fifth ground side optical transmission device 45, and the interval between the third ground side optical transmission device 43 and the sixth ground side optical transmission device 46 are set based on a conveyance speed of the traveling carriage 20 (conveyance capacity of the main conveyor device 11), a power generation capacity of the power generation motor 32, a drive capacity of the belt driving motor 31 and the like.

The ground side optical transmission devices 41, 42, 43, 44, 45, and 46 transmit instruction signals from the supervisory controller 40 to the carriage side optical transmission device 39 when the traveling carriage 20 passes.

Next, control of power generation by the power generation motor 32 of the traveling carriage 20 will be described.

The traveling carriage 20 travels by drive of the carriage driving device 50. Specifically, the body 21 is thrusted forward by passing the fin 26 of the traveling carriage 20 between the pair of pinch rollers 51 rotating by drive of the driving motor 53 of the carriage driving device 50 and thrusting the fin 26 forward. Thereby, the wheel 25 supported by the body 21 rotates, and the traveling carriage 20 travels. In other words, by drive of the driving motor 53 of the carriage driving device 50, the wheel 25 is indirectly rotated.

The power generation motor 32 generates electric power necessary to drive the belt conveyor 23 by the traveling carriage 20 traveling on the conveyance path K. Specifically, the power generation motor 32 is driven by the wheel 25 of the traveling carriage 20 rotating for the traveling carriage 20 to travel, and generates the necessary power to drive the belt conveyor 23. In other words, the power generation motor 32 is driven by the wheel 25 being indirectly rotated by drive of the driving motor 53 of the carriage driving device 50. That is to say, the driving force of the driving motor 53 is distributed to traveling of the traveling carriage 20 and power generation of the power generation motor 32.

Here, in the sorting facility 10, all the traveling carriages 20 in the sorting facility 10 stop traveling after all sorting operations in the equipment are finished, or due to a power failure or the like in the equipment. When sorting operations in the equipment are started, or after the power failure in the equipment is restored, all the traveling carriages 20 stopping in the sorting facility 10 are simultaneously actuated. At this time, all the traveling carriages 20 in the sorting facility 10 travel by the driving force of the driving motor 53. When the wheels 25 rotate following traveling of the traveling carriages 20, and the power generation motors 32 provided in all the traveling carriages 20 in the sorting facility 10 simultaneously start power generation, the driving forces of the driving motors 53 are distributed to traveling of the traveling carriages 20 and power generation of the power generation motors 32. Accordingly, excessive load is exerted on the driving motors 53 at the time of actuation. Therefore, it is impossible to sufficiently distribute the driving force necessary for traveling of the traveling carriages 20 to the traveling carriages 20, and it is impossible to run the traveling carriages 20 stably.

Thus, when all the traveling carriages 20 in the sorting facility 10 are simultaneously actuated, the load on the driving motors 53 at the time of actuation of the traveling carriages 20 is reduced by distributing power generation timings of the power generation motors 32 provided in the respective traveling carriages 20, in the sorting facility 10.

Specifically, after all the traveling carriages 20 in the sorting facility 10 are actuated, and traveling speeds are kept constant at a predetermined speed, drive is started in order from the power generation motor 32 provided in the traveling carriage 20 that first passes any of the ground side optical transmission devices 41, 43, and 45. In other words, after all the traveling carriages 20 in the sorting facility 10 are actuated, and the traveling speeds are kept constant at a predetermined speed, power generation is started in order from the power generation motor 32 provided in the traveling carriage 20 scheduled to pass through the induction conveyor 12, the article detection device 55, or the chute 13 provided at the conveyance downstream side of the ground side optical transmission device 41, 43, or 45 first. Here, the predetermined speed is a traveling speed allowing the traveling carriages 20 to travel stably on the conveyance path K, and is a traveling speed set based on degrees of lift of the traveling carriages during travelling, an interval between the adjacent traveling carriages 20 and the like.

For example, as illustrated in FIG. 1, a traveling carriage 20a stops at a conveyance upstream side from the position where the first ground side optical transmission device 41 is disposed before actuation of all the traveling carriages 20 in the sorting facility 10. When the traveling carriage 20a passes the position where the first ground side optical transmission device 41 is disposed after all the traveling carriages 20 in the sorting facility 10 are actuated and the traveling speeds of all the traveling carriages 20 in the sorting facility 10 are kept constant at the predetermined speed, the carriage side optical transmission device 39 provided in the traveling carriage 20a receives an instruction signal to operate the power generation motor 32 from the first ground side optical transmission device 41. The power generation motor 32 provided in the traveling carriage 20a starts drive based on the instruction signal, and starts generation of electric power necessary to drive the belt conveyor 23. Similarly, a traveling carriage 20b following (at the conveyance upstream side) the traveling carriage 20a passes the position where the first ground side optical transmission device 41 is disposed after all the traveling carriages 20 in the sorting facility 10 are actuated and the traveling speeds of all the traveling carriages 20 in the sorting facility 10 are kept constant at the predetermined speed, the power generation motor 32 provided in the traveling carriage 20b starts drive, and starts generation of electric power necessary to drive the belt conveyor 23. As the traveling carriages 20a and 20b pass the position where the fourth ground side optical transmission device 44 is disposed, the carriage side optical transmission devices 39 provided in the traveling carriages 20a and 20b receive instruction signals to operate the belt driving motors 31 from the fourth ground side optical transmission device 44. The belt conveyors 23 provided in the traveling carriages 20a and 20b start drive in the loading position (driving position) based on the instruction signals, and operate the belts 24 of the belt conveyors 23 to receive the articles 90 from the induction conveyor 12.

Similarly, as illustrated in FIG. 1, a traveling carriage 20c stops at a conveyance upstream side from the position where the second ground side optical transmission device 42 is disposed before actuation of all the traveling carriages 20 in the sorting facility 10. When the traveling carriage 20c passes the position where the second ground side optical transmission device 42 is disposed after all the traveling carriages 20 in the sorting facility 10 are actuated and the traveling speeds of all the traveling carriages 20 in the sorting facility 10 are kept constant at the predetermined speed, the carriage side optical transmission device 39 provided in the traveling carriage 20c receives an instruction signal to operate the power generation motor 32 from the second ground side optical transmission device 42. The power generation motor 32 provided in the traveling carriage 20c starts power generation based on the instruction signal. Similarly, when a traveling carriage 20d following the traveling carriage 20c passes the position where the second ground side optical transmission device 42 is disposed after all the traveling carriages 20 in the sorting facility 10 are actuated and the traveling speeds of all the traveling carriages 20 in the sorting facility 10 are kept constant at the predetermined speed, the power generation motor 32 provided in the traveling carriage 20d starts power generation. As the traveling carriages 20c and 20d pass the position where the fifth ground side optical transmission device 45 is disposed, the carriage side optical transmission devices 39 provided in the traveling carriages 20c and 20d receive the instruction signals to operate the belt driving motors 31 from the fifth ground side optical transmission device 45. Based on the instruction signals, the belt conveyors 23 provided in the traveling carriages 20c and 20d start drive in the adjustment position (driving position) to operate the belts 24 of the belt conveyors 23, and thereby adjust the placement locations of the articles 90 on the belt conveyors 23.

Similarly, as illustrated in FIG. 1, a traveling carriage 20e stops at a conveyance upstream side from the position where the third ground side optical transmission device 43 is disposed before actuation of all the traveling carriages 20 in the sorting facility 10. When the traveling carriage 20e passes the position where the third ground side optical transmission device 43 is disposed after all the traveling carriages 20 in the sorting facility 10 are actuated and the traveling speeds of all the traveling carriages 20 in the sorting facility 10 are kept constant at the predetermined speed, the carriage side optical transmission device 39 provided in the traveling carriage 20e receives an instruction signal to operate the power generation motor 32 from the third ground side optical transmission device 43. The power generation motor 32 provided in the traveling carriage 20e starts power generation based on the instruction signal. Similarly, when a traveling carriage 20f following the traveling carriage 20e passes the position where the third ground side optical transmission device 43 is disposed after all the traveling carriages 20 in the sorting facility 10 are actuated and the traveling speeds of all the traveling carriages 20 in the sorting facility 10 are kept constant at the predetermined speed, the power generation motor 32 provided in the traveling carriage 20f starts power generation. As the traveling carriages 20e and 20f pass the position where the sixth ground side optical transmission device 46 is disposed, the carriage side optical transmission devices 39 provided in the traveling carriages 20e and 20f receive the instruction signals to operate the belt driving motors 31 from the sixth ground side optical transmission device 46. Based on the instruction signals, the belt conveyors 23 provided in the traveling carriages 20e and 20f start drive in the delivery position (driving position) to operate the belts 24 of the belt conveyors 23, and thereby deliver the articles 90 on the belt conveyors 23 to the chute 13.

As described thus far, according to the present embodiment, generation of the electric power necessary to drive the belt conveyor 23 is started in order from the power generation motor 32 provided in the traveling carriage 20 scheduled to firstly pass the position (driving position) requiring drive of the belt conveyor 23 on the traveling carriage 20 after all the traveling carriages 20 in the sorting facility 10 are actuated and the traveling speed is kept constant at the predetermined speed, and therefore, it is possible to distribute the power generation timings of the power generation motors 32 at the time of actuation of the traveling carriages 20. As a result, at the time of the actuation of the traveling carriages 20, the power generation motors 32 provided in all the traveling carriages 20 traveling on the conveyance path K do not start power generation to drive the belt conveyors 23 simultaneously, and it is possible to reduce load on the driving motors 53 for running the traveling carriages 20. Accordingly, it is possible to sufficiently distribute the driving force of the driving motors 53 to traveling of the traveling carriages 20, and it is possible to stably run the traveling carriages 20 at the time of actuation of the traveling carriages 20. Further, it is possible to shorten a time period until the traveling carriages 20 stably travel at the predetermined conveyance speed after the traveling carriages 20 are actuated.

In the present embodiment, power generation is started in order from the power generation motor 32 provided in the traveling carriage 20 firstly passing any of the ground side optical transmission devices 41, 43, and 45 after all the traveling carriages 20 in the sorting facility 10 are actuated and the traveling speeds are kept constant at the predetermined speed. However, the present invention is not limited to this, and power generation may be started, for example, in order from the power generation motor 32 provided in the traveling carriage 20 passing any of the ground side optical transmission devices 41, 43, and 45, after all the traveling carriages 20 in the sorting facility 10 are actuated and the traveling carriages 20 travel a predetermined distance, or after all the traveling carriages 20 in the sorting facility 10 are actuated and the traveling carriages 20 travel for a predetermined time period. Here, the predetermined distance refers to a traveling distance of the traveling carriages 20 required until the traveling speeds of all the traveling carriages 20 in the sorting facility 10 are kept constant at the predetermined speed after all the traveling carriages 20 in the sorting facility 10 are actuated. The predetermined time period refers to a traveling time period of the traveling carriage 20 required until the traveling speeds of all the traveling carriages in the sorting facility 10 are kept constant at the predetermined speed after all the traveling carriages 20 in the sorting facility 10 are actuated. In this case, start of power generation of the power generation motor 32 is controlled by a controller loaded on the traveling carriage 20.

In the present embodiment, the carriage driving device 50 for running the traveling carriage 20 is composed of a friction drive type driving device. However, the carriage driving device 50 is not limited to this, and may be composed of, for example, a linear motor type driving device. Further, a driving device loaded on the traveling carriage 20 may run the traveling carriage 20.

REFERENCE SIGNS LIST

10 Sorting facility
20 Traveling carriage
23 Belt conveyor
32 Power generation motor (power generation device)
90 Article
K Conveyance path

What is claimed is:

1. A sorting facility for sorting one or more articles in which a conveyance path for conveying said articles is formed, the sorting facility comprising:
 a plurality of traveling carriages, each of the traveling carriages being connected to each other and traveling along the conveyance path, each of the traveling carriages being configured to convey one of the articles along the conveyance path, each of the traveling carriages comprising:
  a belt conveyor on which the one of the articles is placed;
  a wheel configured to travel along the conveyance path; and
  a belt driving device configured to drive the belt conveyor at one of more driving positions on the conveyance path at which driving of the belt conveyor is required, the belt driving device comprising:
   a belt driving motor configured to drive the belt conveyor;
   a power generation device connected to the wheel, the power generation device being configured to generate electric power by rotation of the wheel; and
   a capacitor configured to store electric power generated by the power generation device and supply the stored electric power to the belt driving motor; and
  a controller configured to respectively control the power generation devices of the traveling carriages and distribute timing of power generation of the power generation devices,
  wherein, after the traveling carriages are actuated and predetermined traveling speeds of the traveling carriages are obtained and kept constant, the power generation devices of the traveling carriages are respectively controlled by the controller to start generation of a necessary amount of the electric power to be stored in the capacitor in order starting from the power generation device provided in the traveling carriage scheduled to pass through the driving positions first, and
  wherein the timing of the power generation of the power generation devices is respectively controlled by the controller at times at which actuations of the belt driving devices of the traveling carriages respectively take place.

2. The sorting facility according to claim 1, wherein, after the traveling carriages are actuated and predetermined traveling speeds of the traveling carriages are obtained and kept constant, the power generation device in one of the traveling carriages traveling to a position at an upstream side from one of the driving positions is configured to start the generation of the necessary amount of the electric power to drive the belt conveyor.

3. The sorting facility according to claim 1, further comprising:
 a ground side communication device configured to communicate with the power generation device, the ground side communication device being provided in a position at an upstream side from one of the driving positions,
 wherein, after the traveling carriages are actuated and predetermined traveling speeds of the traveling carriages are obtained and kept constant, the power generation device in one of the traveling carriages traveling to the position at the upstream side from the one of the driving positions is configure to start the generation of the necessary amount of the electric power to device the belt conveyor when a signal is received from the ground side communication device.

4. The sorting facility according to claim 1, wherein the driving positions are one or more of a loading position configured to load the article onto the belt conveyor, an adjustment position being at a downstream side from the loading position and configured to adjust a placement location of the article on the belt conveyor, and a delivery position being a position at a downstream side from the adjustment position and configured to deliver the article on the belt conveyor.

5. The sorting facility according to claim 2, further comprising:
 a ground side communication device configured to communicate with the power generation device, the ground side communication device being provided in a position at the upstream side from one of the driving positions,
 wherein, after the traveling carriages are actuated and predetermined traveling speeds of the traveling carriages are obtained and kept constant, the power generation device in one of the traveling carriages traveling to the position at the upstream side from the one of the driving positions is configured to start the generation of the necessary amount of the electric power to drive the belt conveyor when a signal is received from the ground side communication device.

6. The sorting facility according to claim 5, wherein the driving positions are one or more of a loading position configured to load the article onto the belt conveyor, an adjustment position being at a downstream side from the loading position and configured to adjust a placement location of the article on the belt conveyor, and a delivery position being at a position at a downstream side from the adjustment position and configured to deliver the article on the belt conveyor.

7. The sorting facility according to claim 2, wherein the driving positions are one or more of a loading position configured to load the article onto the belt conveyor, an adjustment position being at a downstream side from the loading position and configured to adjust a placement location of the article on the belt conveyor, and a delivery position being at a position at a downstream side from the adjustment position and configured to deliver the article on the belt conveyor.

8. The sorting facility according to claim 3, wherein the driving positions are one or more of a loading position configured to load the article onto the belt conveyor, and adjustment position being at a downstream side from the loading position and configured to adjust a placement location of the article on the belt conveyor, and a delivery position being at a position at a downstream side from the adjustment position and configured to deliver the article on the belt conveyor.

9. A sorting facility for sorting one or more articles in which a conveyance path for conveying said articles is formed, the sorting facility comprising:
   a plurality of traveling carriages, each of the traveling carriages being connected to each other and traveling along the conveyance path, each of the traveling carriages being configured to convey one of the articles along the conveyance path, each of the traveling carriages comprising:
      a belt conveyor on which the one of the articles is placed;
      a wheel configured to travel along the conveyance path; and
      a belt driving device configured to drive the belt conveyor at one of more driving positions on the conveyance path at which driving of the belt conveyor is required, the belt driving device comprising:
         a belt driving motor configured to drive the belt conveyor;
         a power generation device connected to the wheel, the power generation device being configured to generate electric power by rotation of the wheel; and
         a capacitor configured to store electric power generated by the power generation device and supply the stored electric power to the belt driving motor;
   a carriage driving device provided in a predetermined position of the conveying path, the carriage driving device being configured to transmit a motive power to the traveling carriages by using a frictional force by contact of a driving roller; and
   a controller configured to respectively control the power generation devices of the traveling carriages and distribute timing of power generation of the power generation devices,
   wherein, after the traveling carriages are actuated by the carriage driving device and predetermined traveling speeds of the traveling carriages are obtained and kept constant, the controller controls the respective power generation device of the traveling carriage to start generation of the necessary amount of the electric power to be stored in the capacitor in order starting from the power generation device provided in the traveling carriage scheduled to pass through the driving positions first, thereby the controller respectively distributes timing of power generation of the power generation devices at times at which the actuations of the belt driving device of the traveling carriages respectively take place.

* * * * *